(12) United States Patent
Schneider

(10) Patent No.: US 7,885,967 B2
(45) Date of Patent: Feb. 8, 2011

(54) MANAGEMENT OF LARGE DYNAMIC TABLES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 432 days.

(21) Appl. No.: 12/130,872

(22) Filed: May 30, 2008

(65) Prior Publication Data

US 2009/0299966 A1  Dec. 3, 2009

(51) Int. Cl.
G06F 17/30 (2006.01)
(52) U.S. Cl. .................. 707/756; 707/696; 707/736; 707/791; 707/802
(58) Field of Classification Search .................. None
See application file for complete search history.

(56) References Cited

U.S. PATENT DOCUMENTS

| | | | | |
|---|---|---|---|---|
| 5,179,701 A | * | 1/1993 | Chisholm | .................. 1/1 |
| 6,584,474 B1 | * | 6/2003 | Pereira | .................. 1/1 |
| 7,421,445 B2 | | 9/2008 | O'Neil et al. | |
| 7,769,729 B2 | * | 8/2010 | Faerber et al. | .............. 707/693 |
| 2008/0052486 A1 | * | 2/2008 | Davis | .................. 711/206 |
| 2008/0104478 A1 | * | 5/2008 | Oz et al. | .................. 714/755 |
| 2008/0281857 A1 | | 11/2008 | Dymetman | |

* cited by examiner

*Primary Examiner*—Apu M Mofiz
*Assistant Examiner*—Hung D Le
(74) *Attorney, Agent, or Firm*—Blakely, Sokoloff, Taylor & Zafman LLP

(57) ABSTRACT

Managing a table as multiple ordered blocks of entries. Each block has a local index value for each entry, and each entry has an associated element value. The entries in the table are monotonically ordered, and the table is searchable by element value and entry index value. Each block has an offset based on the number of entries in the blocks preceding it in order. The global index of an entry in a block is the offset combined with the local offset value, such as by adding the two values together.

20 Claims, 9 Drawing Sheets

300

MANAGEMENT OF LARGE DYNAMIC TABLES

FIELD

The invention is generally related to data management, and more particularly to managing dynamic ordered tables that are searchable by entry value and index.

COPYRIGHT NOTICE/PERMISSION

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2008, Red Hat, Inc., All Rights Reserved.

BACKGROUND

Electronic system commonly generate and use data. When a system generates significant amounts of data, the data can be managed with a data table. A table provides an organized way to store, locate, and access data. There are many methods available for data management of data in tables. One type of table management is an ordered table, which may have a monotonically incrementing index value throughout the entire table. Such tables are useful for data that needs to be accessible by both entry value and index value. The entry value refers to the value of the data element, meaning if the data element is known, the table should be searchable by the data element to find its location within the table. The index value refers to the identifier indicating what place in the table is occupied by the data element, and the table should be accessible by index value (e.g., access the 42nd element in the table).

Consider an implementation of a user program or system that allows a table to evolve dynamically and has the potential of generating very large tables that evolve over time. The information in such a table is dynamic in a random fashion. In current table management, every operation on a data element in such a table could potentially require updating a significant fraction of the elements of the table. On average, nearly half of the elements in the table would need to be updated for every insert, move, or remove operation on data elements of the table. More particularly, every insert required updating (incrementing) the index value of every data element subsequent to the inserted data element. Every remove similarly required updating (decrementing) the index value of every data element subsequent to the removed data element. A move (also referred to as a reorder) required updating (either incrementing or decrementing) a group of data elements between the location where the data element was being removed from to the location where the data element was being moved to. As a result, any algorithm that used such large tables suffered poor performance due to the amount of updating required for each operation. The performance of the algorithms reduced the practical use of the large dynamic tables.

BRIEF DESCRIPTION OF THE DRAWINGS

The following description includes discussion of figures having illustrations given by way of example of implementations of embodiments of the invention. The drawings should be understood by way of example, and not by way of limitation.

DETAILED DESCRIPTION

Figure 1:
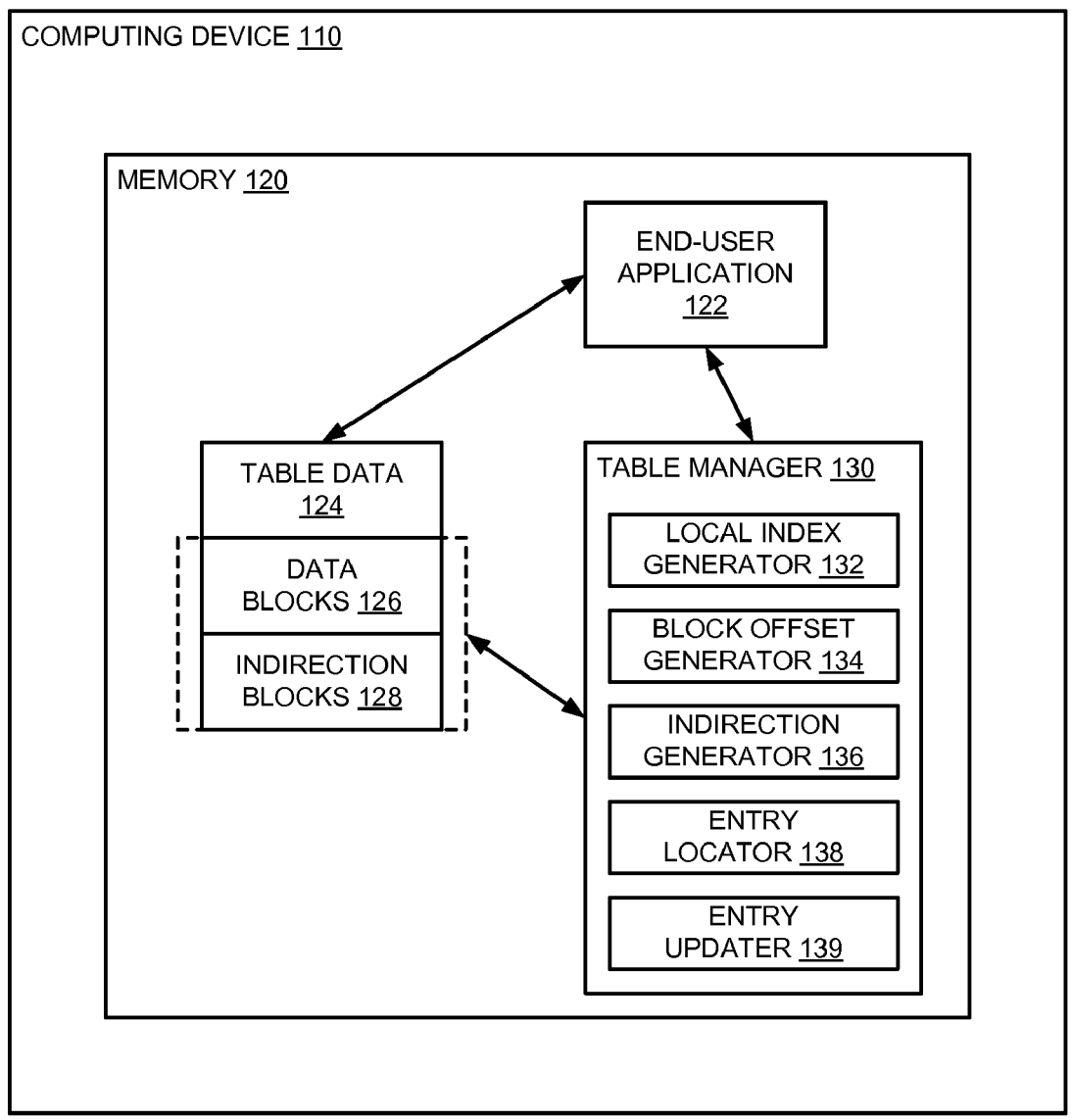
FIG. 1 is a block diagram of an embodiment of a computing device having a table manager to separate table data into multiple blocks.

Mechanisms described herein allow for managing a table as multiple ordered blocks of entries. Instead of a monolithic table with monotonically increasing index values over the entire table, the table is separated into blocks that has a portion of the entries of the table as a whole. Each block has a local index value for each entry of its portion of table entries. The table as a whole is searchable by element value and entry index value, which can be accomplished by having each block searchable by element value and entry index value. Each block has an offset based on the number of entries in the preceding blocks (i.e., the blocks that precede it in order), which can be combined with the local index value to generate a global index value. When entries are added, removed, or simply reordered, the updating of index values is limited to the block where the affected entry is located. Other than the entries in the block, only the offsets of subsequent blocks need to be changed. The result is much less processing when a change is implemented in the entries of the table.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required operations of the method. Structure for a variety of these systems will appear as set forth in the description below. In addition, the present invention is not described with reference to any particular programming language. It will be appreciated that a variety of programming languages may be used to implement the teachings of the invention as described herein.

FIG. 1 is a block diagram of an embodiment of a computing device having a table manager to separate table data into multiple blocks. Computing device 110 could be a desktop or laptop computer, a server, a workstation, or other computing device that may have an application that generates tables. Application 122 executing in memory 120 represents such an application that generates tables. Table data 124 is the data generated by application 122 that is stored in one or more tables. Traditionally, all table data 124 may be stored in a monolithic table. As described herein, table manager 130 separates table data 124 into one or more data blocks 126 and potentially one or more indirection blocks 128.

Computing device 110 includes table manager 130, which can include hardware, software, or a combination. Table manager 130 may be software components executed by a processor of computing device 110. Table manager 130 represents table management as referred to herein to manage table data 124 of memory 120. Table management is not necessarily a unitary entity, but could include functions, mechanisms, calls, operations, etc., by any of a number of components from user-level software to OS kernels, etc. Thus, the components shown as part of table manager 130 represent the management functions provided by table manager 130, whether as hardware, software, or some combination.

Table manager 130 may include some or all of the illustrated components. The various components provide functionality to operate on table data 124. Local index generator 132 generates local index values relative to subtables or blocks of elements. Local index generator 132 orders the entries of the subtable within the subtable, and assigns local index values beginning with a least-significant value (e.g., zero). The entries are increased in order to the last entry in the subtable. Block offset generator 134 generates an offset value for subtables based on a number of entries in all preceding subtables. Indirection generator 136 generates indirection subtables and/or pointers. The indirection subtables point to subtables that hold data, or point to subtable that point to subtables that hold data (and so on, depending on the number of levels or layers of indirection in the system). Indirection generator 136 generates the pointers to the subtables, and in one embodiment, generates pointers from child subtables (i.e., subtables being pointed to from an indirection subtable one level closer to the root) to their parent subtables. Entry locator 138 resolves global index values to local index values to access an entry from its subtable as discussed above, or enables searching the table for an entry value as known in the art. Entry updater 139 reorders subtables that have an entry added or removed, and updates the offset values of all subsequent subtables (including indirection subtables) that are affected by the change in the number of entries in the table. Preceding subtables are not affected by the change in the number of entries in the table, and thus their offset values need not be adjusted.

Figure 2:
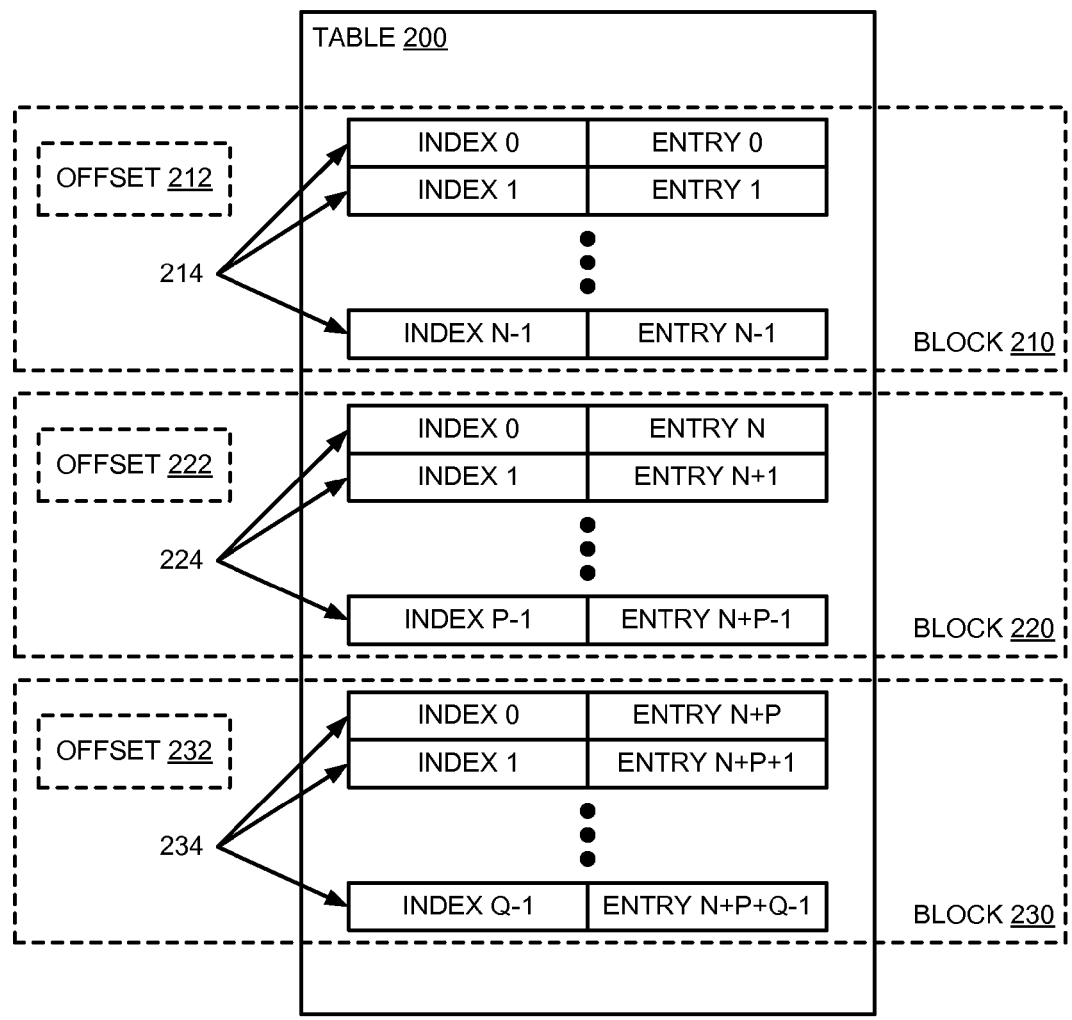
FIG. 2 is a block diagram of an embodiment of a table separated into multiple blocks with local indexes and global offsets.

FIG. 2 is a block diagram of an embodiment of a table separated into multiple blocks with local indexes and global offsets. Table 200 represents a table of data entries. Table 100 may be referred to herein as "the table as a whole" or the complete table. From the perspective of dynamic generation of various blocks and groups of data elements, the dark outline of table 200 may be considered a "starting point" as a monolithic table that grows into a table of ordered groups of ordered entries. Consider that table 200 holds all entries 0 through N+P+Q−1, which are then split among various blocks 210, 220, and 230. In one embodiment, there will always be an even number of blocks, and there may even be a binary number of blocks based on splitting blocks into two separate blocks. However, a binary number (i.e., a power of 2) of blocks is not a requirement, and having an even number of blocks is also not a requirement. Thus, as illustrated, there are three blocks of entries.

Block 210 holds entries 0 to (N−1), block 220 holds entries N to (N+P−1), and block 230 holds entries (N+P) to (N+P+Q−1). Note that N, P, and Q could be equivalent in value (i.e., N=P=Q), but there is no requirement that they are equivalent. Such a requirement could be enforced in one embodiment. In one embodiment, there is a requirement that N, P, and Q be similar in size, such as within an order of magnitude. The choice to make the values different sizes increases the complexity of the logic required for the table management, as would be understood by those skilled in the art.

Each block 210, 220, and 230 includes an offset. Considering the simple case, offset 212 of block 210 would be zero, offset 222 of block 220 would be N, and offset 232 of block 230 would be N+M. More complex cases can be considered where the offsets based on the number of entries in the blocks, but do not necessarily match the number of entries in the preceding blocks. While such implementations could be created, they would increase the processing logic of the table management. Such implementations are discussed below with respect to the general case, but will otherwise not be further discussed in reference to the figures.

Block 210 has index values 214 for each entry 0 to N−1. Index values 214 may be referred to as "local" index values, referring to the fact that the index starts at zero (or some other least significant value as described below), and increments monotonically to N−1 within block 210. Index values 224 of block 220, rather than starting at N, also start at the least significant value of zero and increase monotonically within block 220 to the most-significant local value of P−1 (i.e., the total number of entries or spaces within the block). Similarly, local index values 234 of block 230 start at zero and increase through Q−1. For simplicity in description, each element of each block is shown having a value that corresponds with the value of its global index in table 200. Thus, in block 210, the element having index 0 has a value of entry 0, index 1 has a value of entry 1, and so forth. In practice, the element in block 210 with index 0 will have some arbitrary value, and the global index value or global entry value may not be stored anywhere in table 200, but can be derived as discussed below.

To obtain the global index for a table entry, the block offset can be added or otherwise combined (in the complex case where the offset is not simply the number of preceding table elements, or in the complex case where the least-significant value in the blocks is not zero). Thus, consider that offset 222 is N, given there are N elements stored in block 210. The element in block 220 having index 1 will have a global index value of N (the block offset) plus 1 (the local index value) to total N+1, which is the expected value as shown in the figure. Similarly, offset 232 is N+P to reflect the fact that there are a total of N+P elements in all blocks preceding block 230. The element with index 0 has a global offset of N+P, and the element with the local index 1 has a global index of N+P+1.

FIG. 2 provides an example system in which embodiments of the invention may be implemented. In general, mechanisms are described to manage a table as multiple blocks of entries or elements. A monolithic table is divided into blocks, where each block has an associated beginning index value and element count. The elements within a block are sequentially numbered, starting at a least-significant value (e.g, zero). Note that other least-significant values could be used with small changes to the indexing mechanisms. For example, the offset could be changed to account for a least-significant value of other than zero. Alternatively, the logic for determining global index values could account for the adjustment due to the inherent offset built into the least-significant value used. While having the same least-significant value in all blocks is more convenient, a system implementation could be made that uses different least-significant values in different blocks, and adjusts for the differences in the processing logic. A particular element's global (table) index is the index or offset of the block in which the element is located, adjusted by the local index of the element within the block.

Managing the table as blocks with offsets and local index values provides many advantages over a traditional management of a monolithic table. For example, any set of elements within a single block can be reordered without affecting the contents of any other block. Additionally, an element within a block can be deleted by reordering the single block, and then simply decrementing the index of each successive block, rather than renumbering the index value of every successive element. Additionally, an element can be added to a block by reordering the one block, and incrementing the index of each successive block, rather than incrementing every successive element in the table.

There is no requirement that any particular block contain the same number of elements as another. Indeed, there is no requirement that the blocks are all the same size or have the same number of spaces to hold elements. In one embodiment, managing the table as separate blocks or separate groups is done with blocks of different sizes, having differing numbers of available spaces to hold entries within the block. In an alternate embodiment, managing the table as separate blocks is done with blocks of the same size, or at least a similar size (e.g., they are within an order-of-magnitude in size). In one embodiment, the tables are maintained with the same number of elements per table (with a "remainder algorithm" used to determine how to allocate a remainder (e.g., the result of (total number of elements)mod(number of blocks)). Although similarity and/or equivalence in size is not required, enforcing a similarity in size on the blocks would simplify the implementation of the system, requiring less logic to account for offsets In one embodiment, the number of blocks grows automatically and dynamically with the increase of the global table itself. Thus, the table may begin with a single block, which is automatically split when the single block reaches a threshold number of entries. As used herein, a block reaching a threshold number of entries or elements refers to a number of elements in the block becoming equal to a defined value. The threshold may be the size of the block, referring to the number of spaces in the block. Thus, when the block becomes "full," the block is split into multiple blocks. For simplicity, splitting a block into multiple blocks or sub-blocks can be splitting the block into two sub-blocks, where half of the entries can be placed in each of the new (sub-) blocks. Note that some apportionment other than half of the entries into each new block is possible (including simply adding a new sub-block without separating any of the entries into it initially), but the management of the system would be slower, and the new block would eventually be expected to hold entries also. The table as a whole grows as each block receives more entries and the blocks are split again.

In one embodiment, a hierarchical or tree structure for table management is used to employ the same techniques described above. Instead of simply splitting the table into various blocks each containing entries of data elements, the table is split into data blocks that are similar to the blocks or groups described above, and indirection blocks. The indirection blocks do not contain data elements, but pointers to other blocks. In one embodiment, a simple root block as an indirection block with data blocks could be implemented. Alternatively, a deeper tree structure can be implemented with a number of indirection layers in the tree. In such an implementation, the root block is the root node, and there are one or more layers of indirection block layers separating the root node from the data blocks, which are the leaf nodes. In the tree structure, a node is considered a parent node if it has pointers to another node. Every node that is not the root node is a child node, with the parent of the child node being the root node for the first layer of indirection nodes (or the leaf nodes if only two layers are employed), and the parent being the node that is one layer closer to the root node for all other nodes. Consider the examples at FIGS. 6 and 7 for more detail.

In one embodiment, the tree structure is dynamically generated. The table can start with a single block. When the single block reaches a threshold number of entries (e.g., all entries are filled), the table management creates two new blocks: one hold a portion of the entries, and/or receives new entries, and the other (a root node in the first instance) contains pointers to the blocks holding entries, together with base offsets for the data blocks. In a tree structure as described, sub-blocks no longer need to track their own base offset. Instead, they may contain a pointer to their parent block. Once a root node indirection block exists, data blocks can continue to be split and pointers generated and added/stored in the root node to point to the new data blocks until the root node holds a threshold number of pointers. Note that there is no requirement for the indirection blocks to be the same size as the data blocks, and may be at least an order of magnitude smaller in size or hold a number of items (pointers) an order of magnitude or more smaller than the number of items (data elements) held by the data blocks. When the root node at first, or one or more indirection nodes as the tree grows, holds the threshold number of items, the table management can generate additional indirection blocks that are pointed to by the root node, and each points to a number of data blocks. When one layer of indirection blocks is full, another layer of indirection blocks can be added as the number of data elements in the data blocks continues to grow. By maintaining the table in this kind of tree structure, maintaining the indexes of individual elements of the data blocks takes a fraction of the time it would in a flat (monolithic) table.

Figure 3:
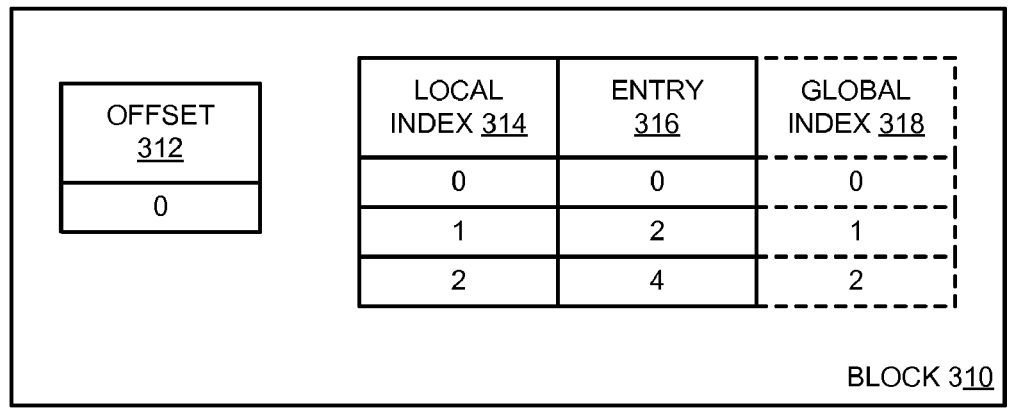
FIG. 3 is a block diagram of an embodiment of table data managed as multiple blocks.
Figure 3:
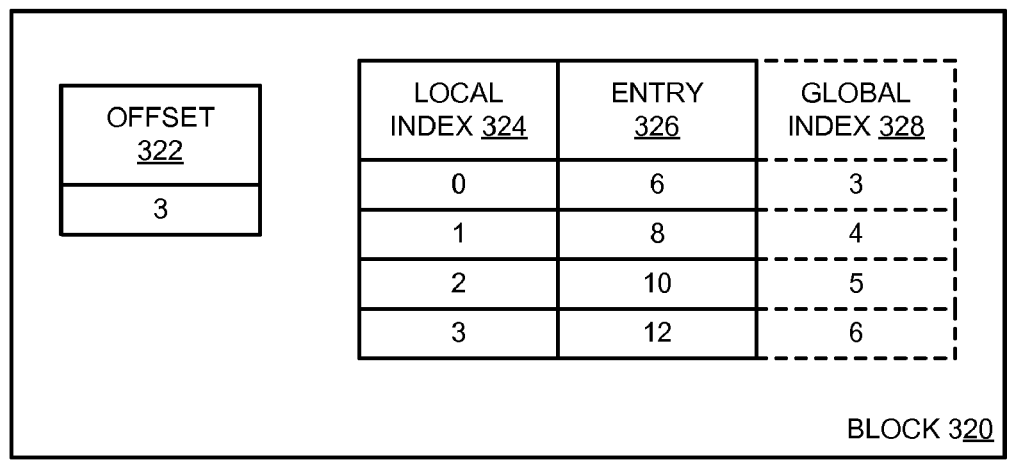
Figure 3:
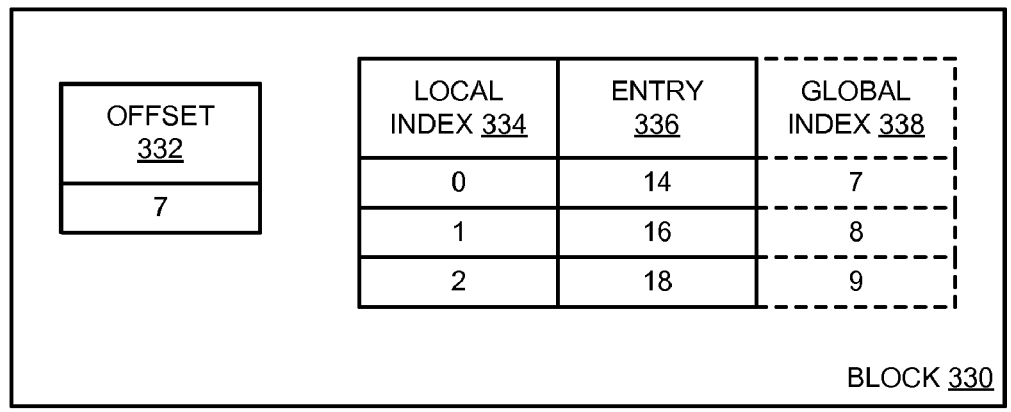

FIG. 3 is a block diagram of an embodiment of table data managed as multiple blocks. Table 300 includes various blocks 310, 320, 330 of data elements. The blocks shown are meant to be illustrative, and may not be all the blocks within table 300. For simplicity in description, each block is shown with a small number of entries (3 or 4), where actual implementations may have blocks with hundreds or thousands of entries per block. Block 310 has offset 312 of '0' indicating the value to be added to the local index values to obtain the global index value. Block 310 has local index values 314 for each entry 316. For purposes of reference, global index 318 is shown, although the actual global index for each entry is not necessarily stored in block 310, but is derived instead.

Block 320 includes offset 322 of value '3' indicating the three entries in the preceding block 310. Recall that not only are the entries within each block ordered, but the blocks themselves are also ordered to achieve global ordering of the entries in table 300. Block 320 includes local index values 324, entries 326, and global index values 328. Block 330 has offset 332 of value '7' indicating the seven entries in the preceding ordered blocks 310 and 320. Block 330 includes local index values 334, entries 336, and global index values 338.

For purposes of simplicity in description, observe that each entry 316, 326, 336 has a different value, the value being two times the value of the corresponding global index value. In an actual implementation, there is no reason to assume that the value of an entry has any relation to its position in the table, although it may. Entries can be strings or numeric values.

Table 300 is searchable by entry value and by entry (global) index. Thus, a program or function could indicate a request related to an entry of value 12. A table manager (not shown) would search the entries in table 300 to locate the entry, as is known in the art. The entry found is located in block 320 with a local index 324 of '3'. Observe that global index 328 of '6' is derived by adding local index 324 of '3' to offset 322 of '3' to obtain '6', which corresponds to the expected value as shown in the figure. A similar process will hold true for all other entries shown. To find an entry by index, a program or function can request an operation on the entry with index of '8'. Note that in one embodiment, the programs or functions need not have any knowledge how the table is managed. Thus, requesting the entry with index '8' would refer to the entry having a global index value of '8'. The program need not know that separate blocks of data elements are used, or know where in a block the entry is located. The table manager can take the requested index of '8' and compare it against the offset values of the blocks. The value of '8' is greater than offset 332 of value '7', and would be less than an offset of value '10' that would correspond to the next-ordered block, assuming one existed. Thus, the table manager would search within block 330, subtracting the offset '7' from the requested index '8' to obtain local index value '1', which indicates the entry having a value of 16. The entry having value '16' indeed corresponds with global index 338 of value '8', confirming the process. A similar process could be used to find other values within table 300.

Figure 4:
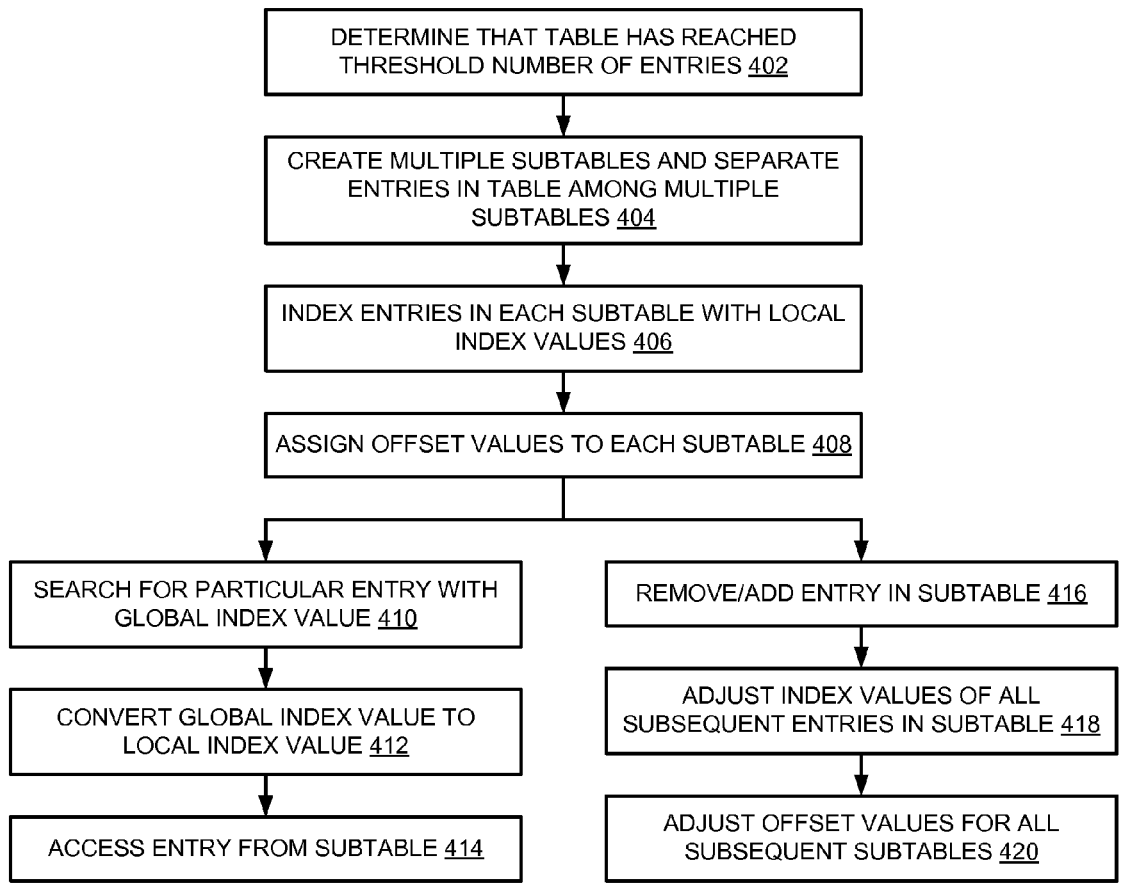
FIG. 4 is a flow diagram of an embodiment of a process for managing a table as multiple ordered blocks of entries.

FIG. 4 is a flow diagram of an embodiment of a method for managing a table as multiple ordered blocks of entries. The method may be performed by processing logic that may comprise hardware (e.g., circuitry, programmable logic, microcode, etc.), software (such as instructions run on a processing device), or a combination thereof. In one embodiment, the method is performed by a table management entity (e.g., table manager 130 of FIG. 1).

Table management (e.g., table manager 130 of FIG. 1) determines that a table (e.g., table 200 of FIG. 2, table 300 of FIG. 3) has reached a threshold number of entries, 402. In a simple case, the entire memory space used for the table is segmented logically into equal sized blocks. The block size is implementation specific, and will depend at least partially on the number of total entries anticipated to be generated within an implementation. In such a simple case, the threshold may be that a first block is filled with entries. In response to determining the threshold has been reached, the table management creates multiple subtables or blocks (e.g., blocks 210, 220, 230, 310, 320, 330) and separates entries in the table among the multiple subtables, 404.

The entries within each block or subtable are ordered within the subtable. The table management indexes entries in each subtable with local index values, 406. The local index values indicate a position relative to the subtable rather than to the table as a whole. The table management assigns an offset to each subtable, based on the number of entries in the subtables that are prior to the subtable in order, 408.

A system having the table could generate a search for a particular entry using a global index value, 410. The subtable determines or identifies based on the global index value what subtable stores the particular entry being sought. The table management converts the global index value to a local index value, 412, by adjusting the global index value by the offset of the identified subtable. An example of converting a global index value to a local index value is provided above with reference to FIG. 3. The table management can then enable access by the system to the entry from the subtable, 414.

The system could remove or add (or move) an entry in a subtable, 416. Moving the entry within a subtable causes a reordering of the elements of the subtable, but leaves unaffected any other subtable. Removing or adding an entry in a subtable causes a reordering within the subtable, but does not require reordering of entries in other subtables. Rather, the table management adjusts the index values of all entries within the local subtable in which the entry was added or removed, 418, and adjusts (decrements or increments, respectively) the offset values for all subsequent subtables, 420. Note that the offset of the subtable in which the entry was added or removed does not need to be adjusted, because the number of entries in the subtables prior to it in order are not affected on that operation. Only the offsets of subsequent subtables need to be adjusted to account for the change in number of entries in the global table.

Figure 5:
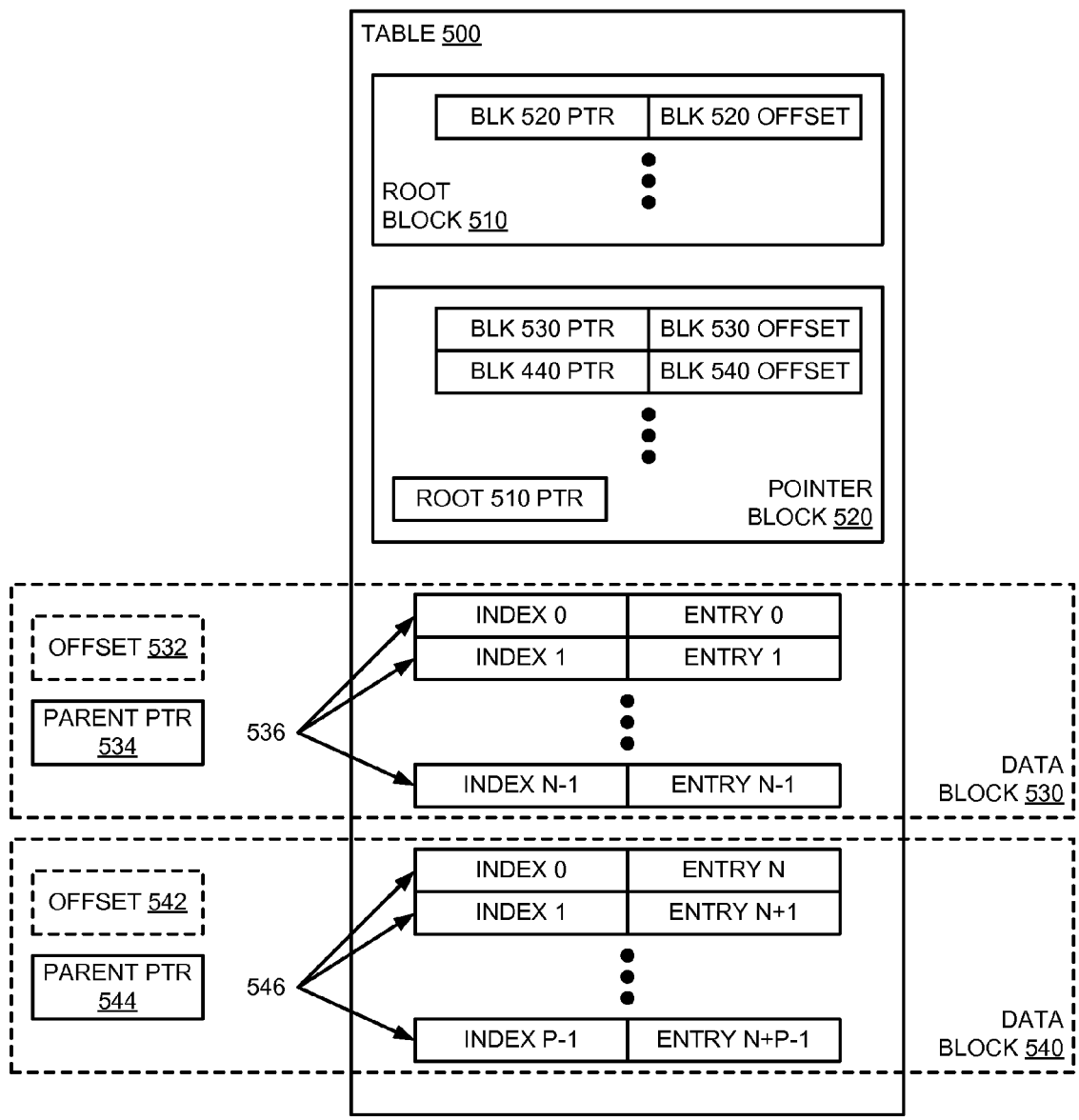
FIG. 5 is a block diagram of an embodiment of a table separated into multiple blocks with indirection, where each data block has local indexes and each indirection block has offsets.

FIG. 5 is a block diagram of an embodiment of a table separated into multiple blocks with indirection, where each data block has local indexes and each indirection block has offsets. Table 500 is an example of a table according to any embodiment described herein. Table 500 is managed with indirection in addition to separation of elements into blocks. Table 500 includes root block 510, which has pointers to indirection blocks, such as pointer block 520. Root block 510 includes a pointer (blk 520 ptr) and an offset value (blk 520 offset) for the indirection block pointed to. If pointer block 520 is the first ordered indirection block of table 500, it may have an offset of '0'. If there is another indirection block (not shown) ordered prior to pointer block 520, the value of blk 520 offset will be derived from the combined number of all entries in all data blocks pointed to by the other indirection block.

Pointer block 520 includes a pointer (root 510 ptr) back to its parent, root block 510. Pointer block 520 can be said to be a child node of root block 510. Pointer block 520 also has children nodes, data blocks 530 and 540. Pointer block 520 includes pointers to data block 530 (blk 530 ptr) and data block 540 (blk 540 ptr), as well as offset values for the two data blocks (blk 530 offset and blk 540 offset, respectively). Note that a table or a block "having" or "including" a value can both be understood as references to the table or block storing the value. A table is generally implemented in a memory or a storage, and each block is a logical segment of the memory or storage where values are stored.

Data block 530 and data block 540 store the actual data element entries of table 500. The root and other indirection blocks simply hold pointers, handles, or some other addressing or indirection mechanism to locate another segment of memory (i.e., another block). The data blocks are considered the leaf nodes of a tree structure. Each data block 530, 540 includes index values 536, 546, respectively, to locally index the entries stored within the data blocks. Data block 530 includes a pointer (parent ptr 534) to its parent, pointer block 520. Similarly, data block 540 includes a pointer (parent ptr 544) to its parent, also pointer block 520. Each data block 530, 540 also has an associated offset 532, 542. In FIG. 5, offsets 532 and 542 are dashed lines, indicating that the offset is not necessarily stored within the data blocks. Rather, in one embodiment, the offsets of any child block is stored by its parent. The block has an associated offset value, but it may be stored at the parent and not at the block itself. Thus, offset 532 is indicated by blk 530 offset of pointer block 520, while offset 542 is indicated by blk 540 offset of pointer block 520.

Figure 6:
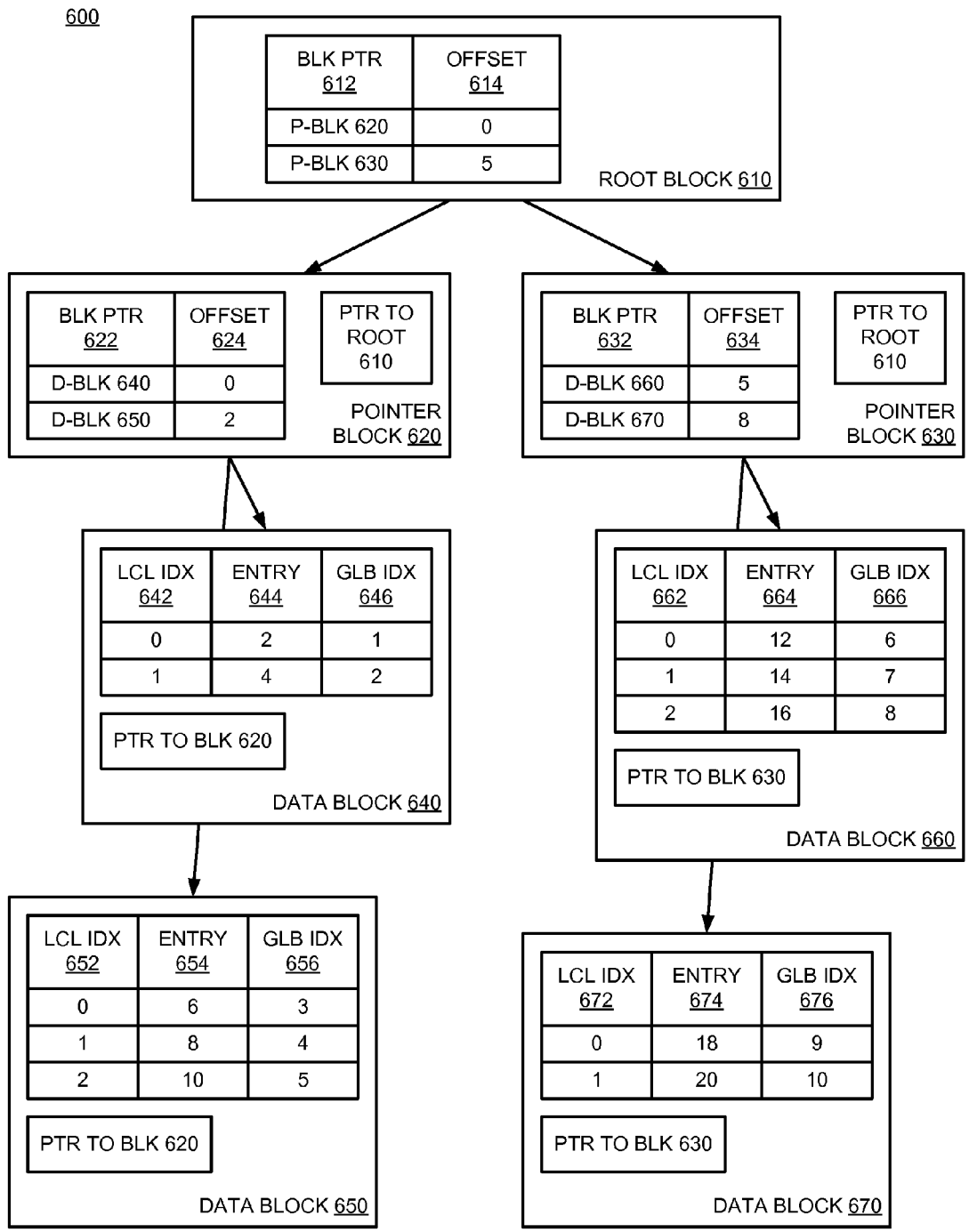
FIG. 6 is a block diagram of an embodiment of table data managed as multiple blocks with indirection.

FIG. 6 is a block diagram of an embodiment of table data managed as multiple blocks with indirection. Table 600 illustrates a simplified example of the use of indirection with block having at most three entries. The principles discussed with reference to table 600 could be applied to any embodiment of a table described herein. Table 600 include root block 610, having block pointers (blk ptr) 612, and offsets 614. Specifically, root block 610 has a pointer to pointer block (p-blk) 620 and pointer block 630.

Pointer block 620 in turn has block pointers 622 referencing data block (d-blk) 640 and data block 650, and offsets 624. Pointer block 620 includes a parent pointer, pointer to root 610. Pointer block 630 has block pointers 632 referencing data blocks 660 and 670, and offsets 634 corresponding to those data blocks. Pointer block 630 also includes pointer to root 610.

Data block 640 includes local index values (lcl idx) 642, and entries 644. Global index values (glb idx) 646 are also shown for convenience, but would likely not be stored in data block 640. Data block 640 has a parent pointer, pointer to block 620. Data block 650 similarly includes local index values 652, entries 654, and pointer to block 620. Data block 650 also shows global index values 656 for illustration. Data blocks 660 and 670 likewise have local indexes, entries, parent pointers, and global indexes (as shown in the Figure). Note the parent pointer is pointers to block 630, seeing that data blocks 660 and 670 are pointed to by pointer block 630 rather than pointer block 620 that points to data blocks 640 and 650.

The offsets are determined as follows. Pointer block 620 has an offset of '0' because there are no preceding ordered blocks. Similarly, data block 640 stores the first values in table 600, and so has an offset 624 of '0'. Data block 650 has an offset 624 of 2, accounting for the two entries in preceding data block 640. Thus, in the generic sense, data block 640 has N=2 entries, which are indexed as local entries 0 and 1 (N−1). Pointer block 630 has an offset 614 of '5', because pointer block 620 points, either directly or indirectly to a total of five entries. Data block 660 has an offset 634 of '5', and data block 670 has an offset 634 of '8'.

Similar to the previous example above, the values of all entries are artificially selected to be two times the value of the global index for the entry. There is no global index of '0', instead starting with value '1'. Observe that because the global index value was selected to start with '1' instead of '0', the data management logic will need to adjust for the least-significant value when locating entries based on the global index. Consider a program or function requesting an operation related to the entry having the global index '4', element value of '8'. To find the entry corresponding to global index '4', the data management can first adjust the global index by subtracting 1 to normalize the least-significant value (one) of the global index values to the least-significant value (zero) of the local indexes. The data management can then compare the value '3' to the offsets of the pointer blocks. The value '3' is greater than the offset ('0') of pointer block 620, and less than the offset ('5') of pointer block 630, as indicated by offset 614 of root block 610. Thus, the data management can traverse the tree by selecting the branch pointing to pointer block 620. Within pointer block 620, the data management can determine from offset 624 that the value '3' is greater than the offset of the last data block, indicating the entry should be found in data block 650. The offset of data block 650 ('2') is subtracted from the value ('3') to normalize the sought-for value to the local index value ('1') of data block 650. Within data block 650, index '1' corresponds to the entry having value of '8', as expected, and as shown by global index 656 of value '4'.

If a program or function sought for the entry having value '16', the data management could search table 600 to find the entry with value '16' within entries 664 of data block 660. The global index can be determined by taking the local index value ('2'), adding it to the local offset value ('5', as shown in offset 634 of pointer block 630), and adjusting the value by adding '1' to normalize the local index least-significant value (zero) to the least-significant value (one) of the global index values. The result is 5+2+1=8, which is the value sought, as confirmed by global index 666, and cross-checked by the 16/2=8 check artificially built into the entry values for this example.

Similar processes could be used to find any other entry by index value and/or by entry value.

Figure 7:
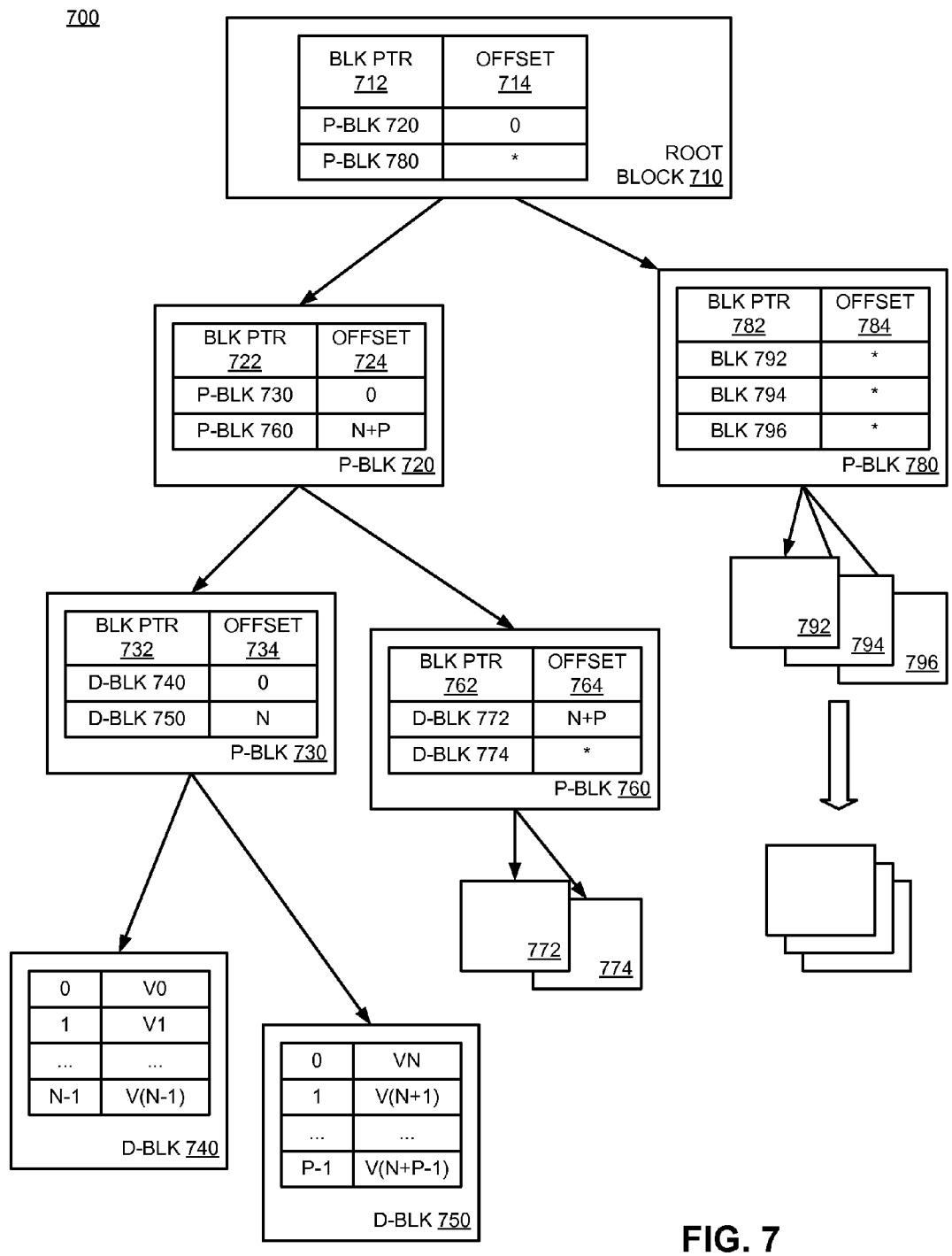
FIG. 7 is a block diagram of an embodiment of table data managed an multiple blocks with multiple levels of indirection.

FIG. 7 is a block diagram of an embodiment of table data managed an multiple blocks with multiple levels of indirection. Table 700 represents an example of a table as described herein, and the principles discussed with respect to table 700 could be applied to any embodiment of a table described herein. Table 700 includes root block 710, having block pointers 712 to pointer block 720 and pointer block 780. Pointer block 720 in turn has block pointers 722 that point to additional indirection blocks, pointer blocks 730 and 760. Pointer block 730 includes block pointers 732 that point to data blocks 740 and 750.

Data block 740 has entries of value V0 through V(N−1), indexed 0 through N−1, respectively. Because the data elements are artificially assigned a generic value corresponding to a monotonically increasing number, the global index values (not shown) of these elements in this example would be the portion of the value shown for the element that does not include the V. Thus, in data block 740, the element of value V0 has a global index of '0', the element of value V1 has a global index of '1', and so forth to the element having the value V(N−1), which has a global index of 'N−1'. Data block 750 has entries of value VN through V(N+P−1), with similarly corresponding global index values (not shown).

Pointer block 760 has block pointers 762, which points to data blocks 772 and 774, which are not shown in detail. Pointer block 780 has block pointers 782 to additional blocks 792, 794, and 796. Each of these blocks may be data blocks, or be additional pointer blocks that will in turn point to data blocks, which is shown generically rather than in detail in FIG. 7. Observe the tree structure of FIG. 7 has root block 710 as the root node, with a first layer of pointer blocks (pointer blocks 720 and 780), a second layer of pointer blocks (730, 760), and finally leaf nodes in the data blocks. For purposes of simplicity of description, many of the examples assume that indirection blocks point to either other indirection blocks or data blocks. However, in one embodiment, an indirection block may point to both one or more data blocks and one or more indirection blocks. Thus, for example, blocks 792-796 may be a combination of indirection and data blocks that are pointed to by pointer block 780. There is no requirement that an indirection block point only to a single type of child block, and there is no requirement that all data blocks (leaf nodes) exist on the same level of the tree. Each indirection block may be split independent of other indirection blocks, and additional levels of the tree may be dynamically created as the table grows. Each separate branch from the root node or another indirection node can expand independently of other branches in the tree.

The offsets are determined as follows. As the first pointer block, or as a pointer block that points indirectly to the first data block having the first ordered entries (i.e., the entry having the lowest global index value of table 700), pointer block 720 has an offset 714 of '0'. Pointer block 730 is the pointer block that directly points to the data block having the first entry of table 700, data block 740, and so pointer block 730 also has an offset 734 of '0'. Data block 750 has an offset 734 of 'N', corresponding to the N values stored in data block 740. Pointer block 760 has an offset 724 of 'N+P', corresponding to N values stored in data block 740, and the P values stored in data block 750. These are the total number of entries preceding the entries of the first ordered data block (772) pointed to (indirectly, in this example) by pointer block 760, and so the combination of their values determines the offset of the pointer block. Data block 772 similarly has an offset 764 of 'N+M'. The offsets of all subsequent blocks, both data blocks and indirection blocks, are indeterminate from the information provided in FIG. 7, but would be calculated in a similar way as the offsets shown.

Note that although FIG. 7 illustrates examples where blocks contain either data or pointers, in one embodiment, hybrid blocks (not shown) could be used. In general, an implementation with hybrid blocks would allow a block to include both data and pointers. The complexity in logic would increase for managing the blocks and the offsets.

For example, consider a tree structure with indexes 0-19, and values of 1-39 (where the value is twice the index plus one). The following tables illustrate various blocks of the tree.

TABLE 1

Block 0 (Offset 0)

| Type | Value | Size |
|---|---|---|
| Data | 1 | |
| Data | 3 | |
| Ptr | Block 1 | 7 |
| Data | 19 | |
| Ptr | Block 2 | 7 |
| Data | 35 | |
| Data | 37 | |
| Data | 39 | |

TABLE 2

| Block 1 (Offset 2, Size 7) | | | Block 2 (Offset 10, Size 7) | | |
|---|---|---|---|---|---|
| Type | Value | Size | Type | Value | Size |
| Data | 5 | | Data | 21 | |
| Data | 7 | | Data | 23 | |
| Ptr | Block 3 | 3 | Data | 25 | |
| Data | 15 | | Ptr | Block 4 | 4 |
| Data | 17 | | | | |

TABLE 3

| Block 3 (Offset 4, Size 3) | | | Block 4 (Offset 13, Size 4) | | |
|---|---|---|---|---|---|
| Type | Value | Size | Type | Value | Size |
| Data | 9 | | Data | 26 | |
| Data | 11 | | Data | 29 | |
| Data | 13 | | Data | 31 | |
| | | | Data | 33 | |

Note that in simpler cases described above, the ordering of the entries was inherent in the ordering of the blocks, and the calculation of the offset could be calculated based on the ordering and the size of the blocks (i.e., the number of entries in the blocks). In one embodiment, the offset of a hybrid-block tree structure is based on the location of the block, whether by order or by reference. The order of the blocks may be considered to be based on reference. Thus, to calculate the offset of any entry that occurs in the table after a pointer, the system determines the size of the subtree (block) referenced by the pointer. One implication of such an approach is that changing an item in a subtree would have to be propagated back up to the root, to prevent being required to traverse every subtree encountered when searching for an offset value. For example, consider tables 1, 2 and 3. To find the offset of the data entry 15, the base offset is the offset of block 1 in which entry 15 is located, which would be adjusted by the size of block 3, which is pointed to within block 1 prior to entry 15. Adjusting the offset of entry 15 by the size of block 3 prevents the need to access block 3 to determine its offset when traversing the tree. Thus, in one embodiment, a pointer is associated with a subtree size, as illustrated in Tables 1, 2, and 3.

Also, each block either needs to know its own global offset, or the system implementing the table would be required to search a lot of entries in each block encountered while traversing back up to the root to find an offset. Note that the same issue exists in a data or pointers block model also, but the logic for traversing is simpler if the pointer is constant size (e.g., pointers always take up 4 bytes or 8 bytes). When such an assumption of constant pointer size can be made, the examination would be as simple as iterating through an array.

However, allowing pointers to be mixed with data, where the data is not necessarily the same size as the pointer structure, increases the complexity of the address arithmetic, as well as the arithmetic to calculate an offset.

Mixing data and pointers in the same block would also complicate the placement of new entries in the table. For example, adding an entry at offset 10 (just before entry 19 in block 0 of Table 1), can actually be added to either block 0 or block 1. Assume that system configuration would determine where to add the entry (e.g., always add to the block with the lowest offset, always add to the block with the highest offset, add to the block having the fewest entries, etc.). If the determination was to add the entry to block 0, the table management would: 1) move everything down from offset 3 in block 0 (corresponds to global offset 10) by enough to insert the data; 2) insert the data in block 0; 3) increment the size of block 0; and, 4) iterate over the blocks referenced past the insertion point and adjust offsets, which would include: 4a) update the offset of block 2 to 11; and, 4b) iterate over block 2 and update child blocks, including: i) updating the offset of block 4 to 14. The iteration would end there because there are no pointers in block 4, and so no additional offsets would be changed.

If, alternatively, the table management determined to insert the data in block 1, the table management would: 1) add the data to block 1, which would not require moving anything since it could be added to the end of block 1; 2) increment the size of block 1 in the block 1 header; 3) increment the size of block 1 in the reference to block 1 in block 0, which would need to be iteratively repeated back to the root, in the case of a deeper insertion; and, continue from #3 as explained above for inserting the data into block 0.

Removing entries would also be more complex, since the table management would be required to traverse the tree back to the root, and then adjust any subsequent subtrees. Contrast the complexity of traversing back to the root to what is described above for the non-hybrid-block case, where it is sufficient simply to traverse back to the root without needing to adjust subsequent subtrees (unless global offsets are stored in blocks, rather than just size information).

Additional complexity would be added in that data and pointer references would need to be indicated or flagged. One simple way to indicate the block element type would be to have a field that either indicates the size of a data item, or the number of items in a referenced subtree, with one of the bits repurposed to be a type indicator. For example, on a 32 bit system, where sizes are restricted to a multiple of 4 bytes, a single 32 bit field, with the high-order bit used to indicate type, would suffice. For example, setting the high order bit could indicate a pointer reference, where the next 32 bit (4 byte) field in the block would be the actual pointer, while the low-order 31 bits of the field would be the subtree size count. Following such an example, if the high-order bit were clear, it could indicate a data item, and the low order 31 bits would be the size of the data item.

In addition, the blocks themselves would need some metadata, such as to indicate their own size and a pointer back to their parent block. Additionally, an indication of the global offset could be provided. Another possible piece of metadata would be a pointer to the reference to this block in the parent block, which would make it a little faster to traverse back up the tree and adjust sizes.

Thus, the complexity of the system could increase substantially. However, it should be understood that it is possible to implement the system where hybrid blocks are used.

Figure 8:
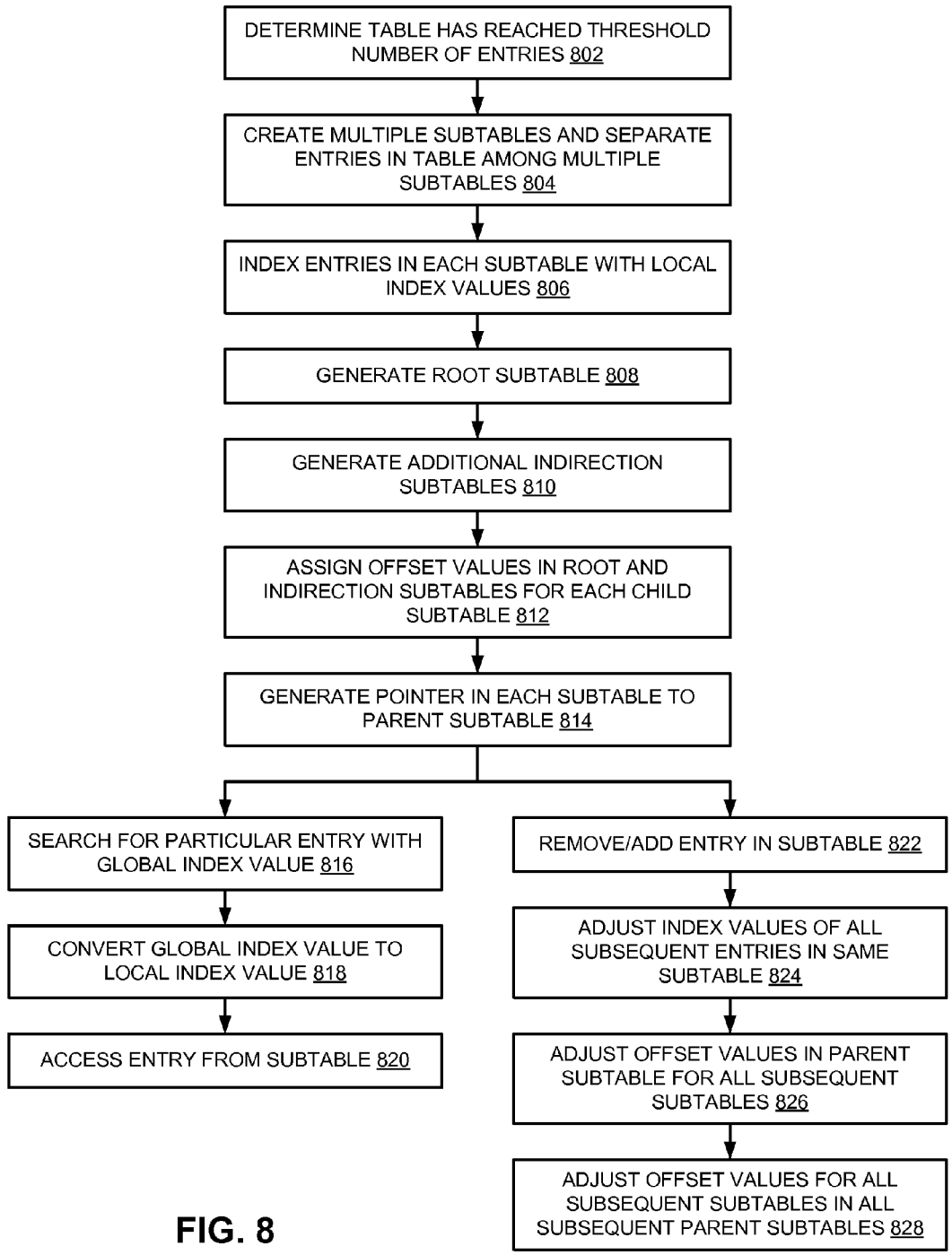
FIG. 8 is a flow diagram of an embodiment of a process for managing a table as multiple ordered blocks of entries with indirection.

FIG. 8 is a flow diagram of an embodiment of a method for managing a table as multiple ordered blocks of entries with indirection. The method may be performed by processing logic that may comprise hardware (e.g., circuitry, programmable logic, microcode, etc.), software (such as instructions run on a processing device), or a combination thereof. In one embodiment, the method is performed by a table management entity or table manager (e.g., table manager 130 of FIG. 1). A table manager determines the table has reached a threshold number of entries, 802. The table could be a monolithic table that gets split as it grows, or could simply be configured from the outset to have multiple blocks. The table manager creates multiple subtables and separates entries of the table among the multiple subtables, 804. The table manager indexes the entries in each subtable with a local index value relative to the subtable rather than relative to the table as a whole, 806.

The table manager generates a root table, 808. The table manager may either immediately or eventually also generate additional indirection subtables, 810. Each root and other indirection subtables include pointers to other subtables. The last layer of indirection subtables points directly to data subtables that hold data elements. In one embodiment, the table manager assigns offset values in the root for each indirection subtable, and assigns offset values in each indirection subtable for each additional indirection subtable pointed to for indirection subtables pointing to other indirection subtables, or assigns offset values in each indirection subtable for each data table pointed to for indirection subtables that point to data subtables, 812. In essence, each parent subtable can store offset values for its immediate (directly pointed to rather than indirectly pointed to) subtables. The offsets could alternatively be stored in a global location within the table and not in the parent subtables. The offsets could also alternatively be stored in the child subtables. Either such alternative would require additional and/or more complex logic for managing the table. In one embodiment, the table manager generates pointers in each subtable to its parent subtable, 814.

The system having the table can search (e.g., via end-user or system software, such as programs or functions) for a particular entry with an entry value or a global index value, 816. When searching with a global index value, the global index value is converted or normalized to a local index value of the subtable in which the entry will be found, 818. The subtable can be found by use of the offsets. The system can then access the entry from the subtable using the local index value, 820.

The system could also remove or add an entry in a subtable, 822. When an entry is removed or added, the offsets of subsequent subtables should be adjusted to account for the change in entries in the preceding blocks. Note that a move within a subtable does not require any changes to any subtables other than reordering the entries within the subtable. A move of an entry to a different subtable can be considered to be a remove for all subtables up to and including the subtable to which the entry is moved. The subtables subsequent to the one into which the entry is moved will not be affected, as the total number of entries in all preceding subtables will not have changed.

Thus, when an entry is removed or added, the table manager adjusts the index values of all subsequent entries within the same subtable, 824. The table manager adjusts the offset values in the parent subtable of the changed subtable, 826. The table manager further adjusts the offset values for all subsequent subtables in all subsequent parent tables that are affected by the change to the changed subtable, 828.

Figure 9:
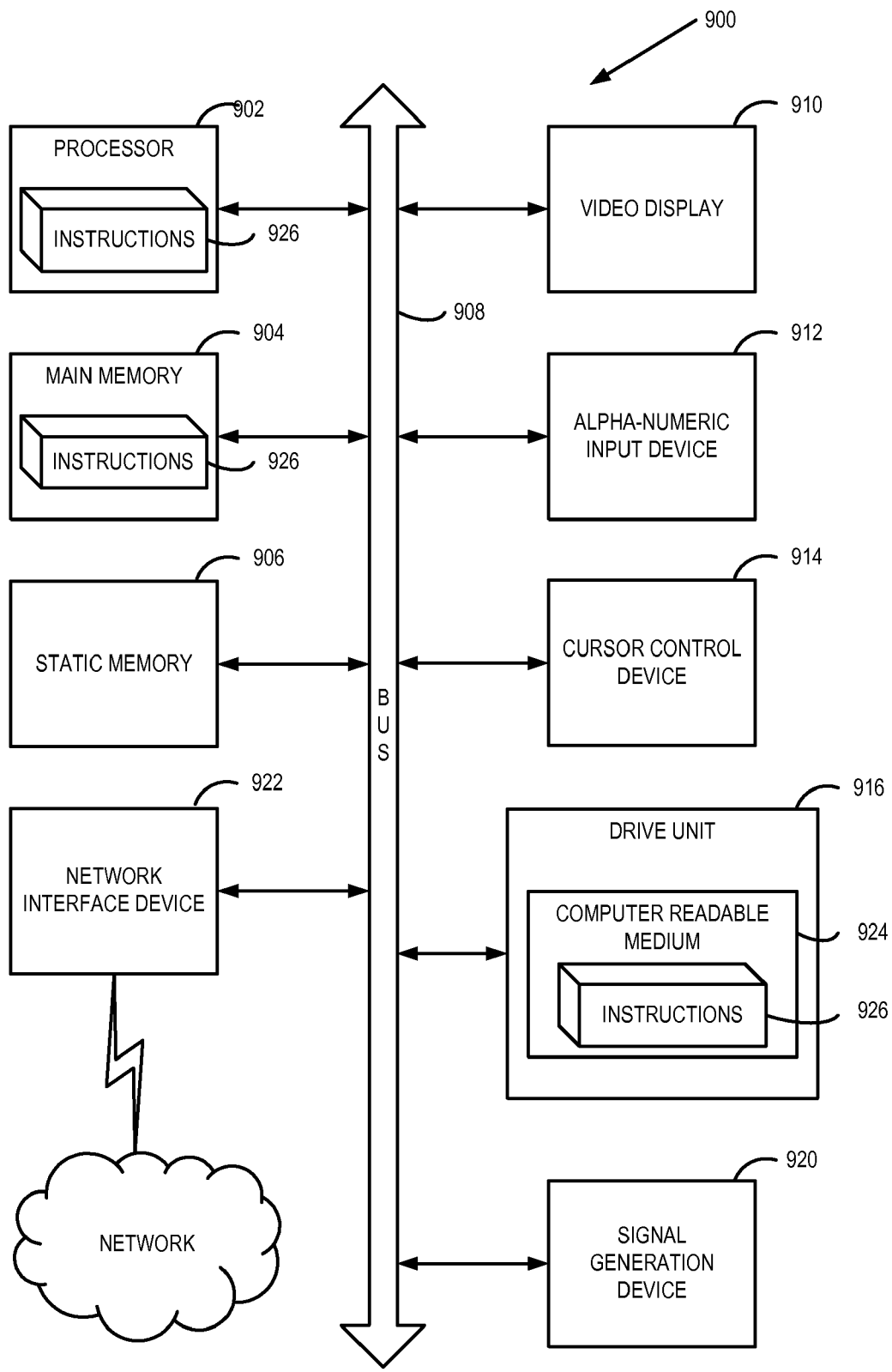
FIG. 9 is a block diagram of a computing device on which embodiments of the invention may be implemented.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-readable storage medium (or more specifically a computer-readable storage medium) 924 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-readable storage media. The software 922 may further be transmitted or received over a network 920 via the network interface device 908.

While the machine-readable storage medium 924 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method for managing table data, comprising:
   a processor;
   managing, by a computing device, a table having sequentially ordered entries as multiple ordered groups of entries, where each entry has an associated entry identifier and index value, and the table is searchable for entries by entry identifier or index value;
   indexing the entries of each of the groups with local index values relative to each group indicating a position within the group rather than indicating a position within the table as a whole, where the local index values start at a least-significant value in each group;
   assigning one offset to one group of the multiple ordered groups, the offset defining a value to combine with the local index values to produce a global index value indicating a position within the table as a whole; and assigning a different offset to the next-ordered group after the one group, the offset derived from the one offset and the number of entries in the one group.

2. The method of claim 1, wherein managing the table as multiple ordered groups comprises:
managing the table as multiple ordered blocks each having a similar number of spaces for entries.

3. The method of claim 1, wherein managing the table as multiple ordered groups further comprises:
automatically splitting existing groups into sub-groups when one or more of the groups reaches a threshold number of entries.

4. The method of claim 1, further comprising:
deleting an entry in the one group;
reordering the entries within the one group in response to deleting the entry; and
decrementing the different offset of the next-ordered group without affecting local index values of entries of the next-ordered group.

5. The method of claim 1, further comprising:
inserting an entry in the one group;
reordering the entries within the one group in response to inserting the entry; and
incrementing the different offset of the next-ordered group without affecting local index values of entries of the next-ordered group.

6. The method of claim 1, further comprising:
moving an entry within the one group; and
reordering the entries within the one group in response to moving the entry, without affecting an order of entries in the next-ordered group.

7. The method of claim 1, further comprising:
storing the one offset within the one group; and
storing the different offset within the next-ordered group.

8. The method of claim 1, wherein each of the multiple groups comprises a data block, and further comprising:
generating a root block;
generating pointers in the root block to indicate an address to point to each of the data blocks; and
storing an offset for each of the data blocks in the root block and not in the data blocks.

9. The method of claim 8, further comprising:
generating a pointer in each of the data blocks to point to the root block.

10. The method of claim 1, wherein each of the multiple groups comprises a data block, and further comprising:
generating a root block;
generating multiple indirection blocks;
generating pointers in the root block to indicate an address to point to the indirection blocks;
generating pointers in the indirection blocks to indicate an address to point to a portion of the data blocks;
storing an offset in the indirection blocks for each of the data blocks to which the indirection block has a pointer; and
storing an offset in the root block for each of the indirection blocks to which the root block has a pointer, where the offset for the indirection blocks is derived from a combined number of entries in all data blocks to which each indirection block directly and indirectly points.

11. An article of manufacture comprising a machine-readable storage medium having content stored thereon to provide instructions to cause a machine to perform operations including:
managing a table having sequentially ordered entries as multiple ordered groups of entries, where each entry has an associated entry identifier and index value, and the table is searchable for entries by entry identifier or index value;
indexing the entries of each of the groups with local index values relative to each group indicating a position within the group rather than indicating a position within the table as a whole, where the local index values start at a least-significant value in each group;
assigning one offset to one group of the multiple ordered groups, the offset defining a value to combine with the local index values to produce a global index value indicating a position within the table as a whole; and
assigning a different offset to the next-ordered group after the one group, the offset derived from the one offset and the number of entries in the one group.

12. The article of manufacture of claim 11, wherein each of the multiple groups comprises a data block, and further comprising content for
generating a root block;
generating multiple indirection blocks;
managing the table as a tree of nodes, where the root block is the root node, and each data block is a leaf node in the tree with one or more layers of indirection blocks separating the leaf nodes from the root block, wherein the layers of nodes are connected with pointers between the layers of nodes and each node is a parent node for a child node that exists one more layer removed from the root node;
storing an offset for each child node in the parent node, where the offset is derived from a combined number of entries in all leaf nodes pointed to by a parent node and its children nodes.

13. The article of manufacture of claim 12, further comprising content for
inserting an entry in an affected data block;
reordering the entries within the affected data block in response to inserting the entry; and
incrementing offsets stored within the parent node of the affected data block for all data blocks having the same parent node and ordered subsequent to the affected data block without affecting local index values of entries of the subsequently-ordered data blocks; and
incrementing offsets stored within a parent of the parent node for all indirection blocks ordered subsequent to the parent node without affecting any values within child nodes of the subsequently-ordered indirection blocks.

14. The article of manufacture of claim 12, further comprising content for
deleting an entry in an affected data block;
reordering the entries within the affected data block in response to deleting the entry; and
decrementing offsets stored within the parent node of the affected data block for all data blocks having the same parent node and ordered subsequent to the affected data block without affecting local index values of entries of the subsequently-ordered data blocks; and
decrementing offsets stored within a parent of the parent node for all indirection blocks ordered subsequent to the parent node without affecting any values within child nodes of the subsequently-ordered indirection blocks.

15. The article of manufacture of claim 12, further comprising content for
moving an entry within an affected data block; and
reordering the entries within the affected data block in response to moving the entry without affecting any values in any parent nodes or other leaf nodes other than the affected data block.

16. The article of manufacture of claim 12, wherein the content for managing the table as multiple ordered groups further comprises content defining the data blocks each having a similar number of spaces for entries, and the indirection blocks as each having a similar number of spaces for pointers.

17. The article of manufacture of claim 12, wherein the content for managing the table as multiple ordered groups further comprises content for
   automatically splitting each data block into multiple data blocks when one or more of the data blocks reaches a threshold number of entries; and
   automatically splitting each indirection block into multiple indirection blocks when one or more of the indirection blocks reaches a threshold number of pointers;
   wherein splitting the data blocks and splitting the indirection blocks are not directly dependent upon each other.

18. An apparatus comprising:
   a memory having a table having sequentially ordered entries as multiple ordered groups of entries, where each entry has an associated entry identifier and index value, and the table is searchable for entries by entry identifier or index value;
   a table manager to manage the table, including index the entries of each of the groups with local index values relative to each group indicating a position within the group rather than indicating a position within the table as a whole, assign a first offset to a first group of the multiple ordered groups, the first offset defining a value to combine with the local index values to produce a global index value indicating a position within the table as a whole, and assign a second offset to the next-ordered group after the first group, the second offset derived from the first offset and the number of entries in the first group; and
   a processor to execute operations from the table manager to operate on the table in the memory.

19. The apparatus of claim 18, wherein each of the multiple groups comprises a data block, the table manager further including an indirection generator to generate a root block with pointers to other blocks, the table manager to manage the table as a tree of nodes, where the root block is the root node, and each data block is a leaf node in the tree with one or more layers of indirection blocks separating the leaf nodes from the root block, wherein the layers of nodes are connected with pointers between the layers of nodes and each node is a parent node for a child node that exists one more layer removed from the root node.

20. The apparatus of claim 18, wherein each of the multiple groups comprises a data block, the table manager further including an entry updater to removing or adding an entry in a first data block, reorder the entries within the first data block in response to removing or adding the entry, and adjust offsets associated with all subsequent data blocks and indirection blocks pointing to the subsequent data blocks that are affected by a change in a number of entries in the table due to the removing or adding of the entry.

* * * * *